(12) United States Patent
Marek et al.

(10) Patent No.: US 9,753,484 B1
(45) Date of Patent: Sep. 5, 2017

(54) SATISFIABILITY FILTER AND QUERY TOOL AND METHOD OF BUILDING A SATISFIABILITY FILTER AND QUERY TOOL

(71) Applicant: The United States of America as represented by the Director of the National Security Agency, Washington, DC (US)

(72) Inventors: Victor W. Marek, Lexington, KY (US); Andrew J. Mayer, San Diego, CA (US); Katrina J. Ray, Odenton, MD (US); Sean A. Weaver, Baltimore, MD (US)

( * ) Notice: Subject to any disclaimer, the term of this patent is extended or adjusted under 35 U.S.C. 154(b) by 522 days.

(21) Appl. No.: 14/120,626

(22) Filed: Jun. 10, 2014

(51) Int. Cl.
*G06F 17/30* (2006.01)
*G06F 1/02* (2006.01)

(52) U.S. Cl.
CPC ...................... *G06F 1/02* (2013.01)

(58) Field of Classification Search
None
See application file for complete search history.

(56) References Cited

U.S. PATENT DOCUMENTS

| | | | | |
|---|---|---|---|---|
| 6,912,700 B1* | 6/2005 | Franco | ................. | G06F 17/504 703/16 |
| 6,990,484 B1* | 1/2006 | Ghazal | .............. | G06F 17/30454 707/723 |
| 7,321,891 B1* | 1/2008 | Ghazal | ............. | G06F 17/30448 |
| 7,653,520 B2* | 1/2010 | De Moura | .......... | G06F 11/3608 703/2 |
| 7,730,436 B2* | 6/2010 | Khasidashvili | ....... | G06F 17/504 716/106 |
| 7,835,898 B2 | 11/2010 | Geist et al. | | |
| 7,904,867 B2 | 3/2011 | Burch et al. | | |
| 8,001,072 B2* | 8/2011 | Meek | ....................... | G06N 5/02 706/47 |
| 8,275,125 B2* | 9/2012 | Vijayarangan | ........ | H04L 9/0637 380/28 |

(Continued)

OTHER PUBLICATIONS

Weaver et al. Satisfiability-based Set Membership Filters, Journal on Satisfiability, Boolean Modeling and Computation 8 (2014), p. 129-148.*

(Continued)

*Primary Examiner* — Debbie Le (57) ABSTRACT

A SAT filter builder and method for building a SAT filter is provided. Hash functions are utilized to map elements of a domain subset to a set of literals which are in turn used to create a set of equations. These equations are conjoined to provide a satisfiability instance. The satisfiability instance is provided to an equation solver and the solution is provided to an array to build the filter. A query tool is also provided which allows the filter built by the SAT filter to test an element for set membership. The query tool utilizes the same hash functions used by the SAT filter builder to map the element to be tested to a set of literals. These literals are used to create an equation. The solution identified by the SAT builder tool is then provided to the equation created by the query tool and set membership is determined by determining whether the equation provided by the query tool is satisfied by the solution provided by the SAT filter builder.

19 Claims, 5 Drawing Sheets

(56) References Cited

U.S. PATENT DOCUMENTS

| | | | |
|---|---|---|---|
| 8,407,175 B2* | 3/2013 | Fuhrmann | G06N 5/048 706/46 |
| 8,533,680 B2* | 9/2013 | Tillmann | G06F 11/3672 717/104 |
| 2006/0184342 A1* | 8/2006 | Narain | H04L 12/4633 703/2 |

OTHER PUBLICATIONS

Pagh, A. et al.; An Optimal Bloom Filter Replacement; in Proc. of 16th Annual ACM-SIAM Symp. on Discr. Algorithms; pp. 823-829; SIAM 2005.

Mitzenmacher, M.; Compressed Bloom Filters; IEEE/ACM Transactions on Networking (TON), 10(5):604-612, 2002.

Brodnik, A. et al.; Membership in Constant Time and Almost-Minimum Space; SIAM Journal on Computing, 28(5);1627-1640, 1999.

Chazelle, B. et al.;The Bloomier Filter:An Efficient Data Struct. for Static Support Lookup Tbls; in Proc. of 15th Ann. ACM-SIAM Symp. on Discr. Algorithms; pp. 30-39; SIAM'04.

Cohen, S. et al.; Spectral Bloom Filters; in Proc. of the 2003 ACM SIGMOD Int'l Conf. on Mgmt. of Data, pp. 241-252; ACM 2003.

Porat, Ely; An Optimal Bloom Filter Replacement Based on Matrix Solving; article available at http://arXiv.org/abs/0804.1845, Apr. 2008.

Almeida, Paulo et al.; Scalable Bloom Filters; Information Processing Letters 101(6), pp. 255-261, 2007.

Bonomi, Flavio et al.; An Improved Construction for Counting Bloom Filters; Proceedings of the European Symposium on Algorithms, 2006.

De Mare, Michael et al.; Secure Set Membership Using 3SAT (Extended Abstract); paper appears in 8th Int'l Conf. on Info. and Communications Security (ICICS) 2006.

Aloul, Fadi et al.; Efficient Symmetry Breaking for Boolean Satisfiability; IEEE Transactions on Computers; vol. 55. No. 5, pp. 549-558; May 2006.

Achlioptas, Dimitris et al.; Generating Satisfiable Problem Instances; in Proceedings of American Assoc. for Artificial Intelligence, 2000, Austin, TX USA.

* cited by examiner

SATISFIABILITY FILTER AND QUERY TOOL AND METHOD OF BUILDING A SATISFIABILITY FILTER AND QUERY TOOL

FIELD OF THE INVENTION

This invention is generally directed to a filter and a query tool for determining set membership.

BACKGROUND OF THE INVENTION

The need to determine set membership is encountered in many computer applications. For example, in many cases it is desired to determine whether an element, x, is a member of a set, Y, wherein x and Y are each provided by a domain, D. If the elements of D have a simple representation and if Y is small, a simple approach to set membership testing can be taken. Namely, list all representations of elements of Y in an array, A, having length |Y| and then, given an element $x \in D$, compare the representation of x against every entry of A. Unfortunately, testing set membership using this simple method is inefficient in a variety of situations, particularly when Y is very large. For this reason, the set membership problem is often solved by first querying a filter. A filter is a mathematical object that can be queried with an element, returning an indication of either maybe or no. Maybe is interpreted by the user as a possible presence of the element x in the set Y and no is interpreted as definite absence of the element x in the set Y. Observe that by contrast, in the simple approach, the indication returned is either positive or negative. With the simple approach, a positive indication is interpreted as a definite presence of the element x in the set Y and a negative indication is interpreted as a definite absence of the element x in the set Y. Unlike the simple approach, however, a filter admits false positives. As a result, when using a filter, a secondary test (such as the simple approach, for example) is sometimes used to further investigate the elements which returned an indication of maybe.

The purpose of a filter, therefore is to provide an efficient primary test for set membership. The amount of space used to store a filter for Y is ideally far less than the space necessary to store Y, and the time required to query a filter is ideally far less than the time required to query Y, even in the case where Y has some natural order and intelligent search methods can be used. The trade-off for the decrease in time and space is that, as mentioned previously, the answers returned by the filter are imprecise. In some instances, an element that passes the filter may require a costly secondary test, but in many instances this secondary test is unnecessary.

Bloom Filter

An example of a well-known filter for testing probabilistic set membership is the Bloom filter. Use of a Bloom filter generally works as follows. Let D be any set (the domain), let $Y \subseteq D$ with $m=|Y|$, and let the memory available for the Bloom filter $B_Y$ be n bits. Next, a hash function, h, is selected that maps the elements of D uniformly at random into the range [0, n]. All of the bits of $B_Y$ are initialized to 0. Next all of the elements of $y \in Y$ are stored into $B_Y$. To store each element y, set the bit at index h(y) to 1, i.e., $B_Y[h(y)]=1$. To store all of Y, store all the elements of Y in turn.

Once the filter is built, the filter may be queried. To query the filter $B_Y$ with an element $x \in D$, check if the bit at index h(x) is set to 1. If so, the filter provides a maybe indication. If the bit is set to 0, then $x \notin Y$ and the filter produces an indication no.

An example of a more typical Bloom filter provides several hash functions $h_1 \ldots h_k$. To store an element $y \in Y$, each hash function $h_1(y) \ldots h_k(y)$ is computed, thereby converting the element x to an array of positions. The bits of $B_Y$ are then set to 1 at each of the positions in the filter associated with the array. To query the typical Bloom filter with $x \in D$, each hash function $h_1(x) \ldots h_k(x)$ is computed thereby converting the element to an array of positions. The bits of $B_Y$ at all of the positions in the filter associated with the array are checked. If any of the bits at the associated positions are set to 0, the filter provides an indication of no and x is rejected; i.e. it is determined that $x \notin Y$. Otherwise, if all of the bits at the associated positions are set to 1, the filter provides an indication of maybe.

In order for this typical Bloom filter to work effectively, n and k must be chosen appropriately for a given m. If n is too small or k is too large, most or all of the bits of $B_Y$ could become set to 1. This means the filter will rarely reject when queried, i.e. the filter will almost always provide an indication of maybe, resulting in a high number of false positives. If the number of false positives becomes too high, the filter $B_Y$ will be rendered useless.

When measuring how well a particular filter construction performs, the distinction between the filter construction algorithm and a particular filter instance output by the algorithm is noted. For example, given a filter instance F, the false positive rate is $$p(F)=P[F(x)=\text{maybe}|x \in D \setminus Y].$$

In other words, the false positive rate p(F) of F is the probability that F passes an element erroneously. For certain inputs, a filter construction algorithm might output a specific filter instance F with a higher or lower false positive rate. To measure the quality of a filter construction, it is necessary to compute an appropriate average of the false positive rate of filter instances. For a given input set Y, let F(Y) be the filter instance, and define the false positive rate of the filter construction under load m to be $$p=P[p(F(Y))|\subseteq D, |Y|=m].$$

That is, the false positive rate of a filter construction is the probability that a filter instance F(Y), built from a uniform random input of size m from the domain D, erroneously accepts an element from D chosen uniformly at random.

When comparing filter constructions, it is standard to assume that $|Y| \ll |D|$; that is, that the number of input elements |Y| is insignificant compared to the total number of elements |D|. Further, it is standard to assume that elements are queried from D uniformly at random. This is the case in essentially all applications, and it simplifies the computation of the false positive rate, since the false positive rate becomes simply the positive rate. In addition, the memory available for each element is far less than the memory needed to represent them perfectly, which is typically assumed to be infinite. This avoids spurious degenerate situations that complicate an analysis, such as having enough memory to simply store Y, resulting in a false positive rate of 0.

If the filter is given a lot of memory, it should have a low false positive rate. So, it is necessary to measure not just the false positive rate of a filter construction, but the efficiency, i.e. how well a filter uses the memory available to it. Information theory provides boundaries on how effective a filter can perform. This is in terms of how much memory the filter uses for a desired false positive rate on a given input set. Given a filter with false positive rate p, n bits of memory, and m=|Y|, the well-known measure of efficiency, ∈, is provided by the following formula:

$$\varepsilon = \frac{-\log_2 p}{n/m}.$$

where,

∈≤1 which represents the information-theoretic limit.

The numerator of ∈ measures the bits of cut-down. For example, if the filter has a false positive rate of ⅛ then it has 3 bits of cut-down. Whereas the denominator is the number of bits of memory available to represent each item in the filter. Intuitively, some number of bits are used to specify each element y∈Y. For example, if there are n=3 bits available to the filter and there are m=6 elements of Y, the filter has half a bit of information available to store each y. From an information-theoretic perspective, it is reasonable to conjecture that the maximum possible cut-down of such a filter is half a bit for a false positive rate of $2^{-\frac{1}{2}}$.

In practice, there are several important factors to consider when choosing a filter construction. In some cases, the one-time work of filter construction may need to be done quickly. In other cases, the every-time work of querying the filter may need to be done quickly. In still other cases, there is a need to provide a very efficient filter; i.e. one which minimizes the size of the filter for a given false positive rate. For these situations, it is noted that even if the memory required for such filters (for example, filters used for virus definitions or malicious website blacklists) is relatively small, a small reduction in memory (e.g. a few megabytes) can save millions of megabytes of bandwidth when the filter is provided to millions of users. In yet, other cases, there is a need to minimize the false positive rate for a given amount of memory.

Bloom filters can achieve an efficiency of at most ln 2 (ln 2≈0.693). Thus, Bloom filters are not very close to achieving the information-theoretic limit of 1 and are therefore, not very memory efficient. Although Bloom filters require little time to construct and little time to query, their achieved efficiency is limited. Compressed Bloom filters have therefore been utilized to improve the efficiency of a traditional Bloom filter. These compressed Bloom filters function similar to traditional Bloom filters, however once built, the filter is compressed in order to reduce the memory necessary for storage of the filter. Although these compressed Bloom filters come closer to achieving the information-theoretic limit than traditional Bloom filters, because the filter must be compressed after building and must be decompressed during the query phase, the improved efficiency achieved by these compressed Bloom filters comes at the expense of both more one-time work and more every-time work. Other methods, such as the method proposed by Pagh in "An Optimal Bloom Filter Replacement" or the method proposed in "An Optimal Bloom Filter Replacement Based on Matrix Solving", have been devised in an attempt to provide a more efficient filter. Each of these methods, however, save memory by sacrificing query time.

Satisfiability

Finite domain constraint satisfaction problems have been used in various applications. Constraint satisfaction problems (aka SAT instances) are encoded as conjunctions of Boolean equations. For example, a SAT instance may be expressed as follows:

$$\chi = C_1 \wedge \ldots \wedge C_m,$$

where the symbol ^ represents logical conjunction (AND) and each $C_i$, 1≤i≤m, is described by a Boolean function B, i.e. an expression of the form $$B(l_{i,1}, \ldots, l_{i,k_i}),$$

where each l is a literal, i.e., a Boolean variable or its negation (NOT). The width of the equation $C_i$ is k if $C_i$ has exactly k distinct literals and no pair of literals is complementary. A pair of literals is said to be complementary if both are the same variable but have different signs, i.e., $x_i$ and $\overline{x_i}$, are complementary literals, Specifically, $$\overline{l_i} = \begin{cases} \overline{x_i} & \text{if } l_i = x_i \\ x_i & \text{if } l_i = \overline{x_i} \end{cases}$$

An assignment v is a function from the set of variables Vars (|Vars|=n) into the set Bool, i.e. {0, 1}. An assignment v satisfies a variable $x_i$ if $v(x_i)=1$ and v satisfies $\overline{x_i}$ if $v(x_i)=0$. An assignment v satisfies an equation $C_i$ if $B(v(l_{i,1}), \ldots v(l_{i,k_i}))=1$ and satisfies a SAT instance, $\chi = C_1 \wedge \ldots \wedge C_m$, if v satisfies all $C_i$, 1≤i≤m. A satisfying assignment for χ is also called a solution. To give an example using a concrete Boolean function, if B is am expression of the form $$L_{i,1} \vee \ldots \vee l_{i,k_i},$$

where the symbol V represents logical disjunction (OR), then an assignment v satisfies $C_i$ if for some j, 1≤j≤$k_i$, $v(l_{i,j})=1$. A random k-SAT instance is a conjunction of equations drawn uniformly, independently, and with replacement from the set of all width k equations.

The equation $C_i$ can be thought of as a constraint on a putative solution. Therefore, a collection of equations, i.e. a SAT instance χ, can be thought of as a conjunction of constraints on a putative solution. Given a random k-SAT instance χ, the strength of χ (as a conjunction constraints) can be measured in terms of the ratio $\alpha_\chi$=m/n. The strength of each constraint indicates how easy or difficult the constraint is to satisfy. The strength of each constraint depends only on its length, k. Thus, intuitively, constraints of equal length represent the same "strength". Random k-SAT instances exhibit quite regular behavior in terms of the equations-to-variable ratio (i.e. m/n). This ratio determines with high probability the satisfiability of the set of equations drawn. Specifically, given a fixed k there exists a number $\alpha_k$ such that whenever $\alpha_\chi < \alpha_k$ then χ is almost certainly satisfiable, and whenever $\alpha_\chi > \alpha_k$ then χ is almost certainly unsatisfiable. Thus, $\alpha_k$ provides a threshold which defines the boundary between satisfiable and unsatisfiable instances. The ratio m/n can be selected, therefore, to ensure that the instance is satisfiable.

Figure 1:
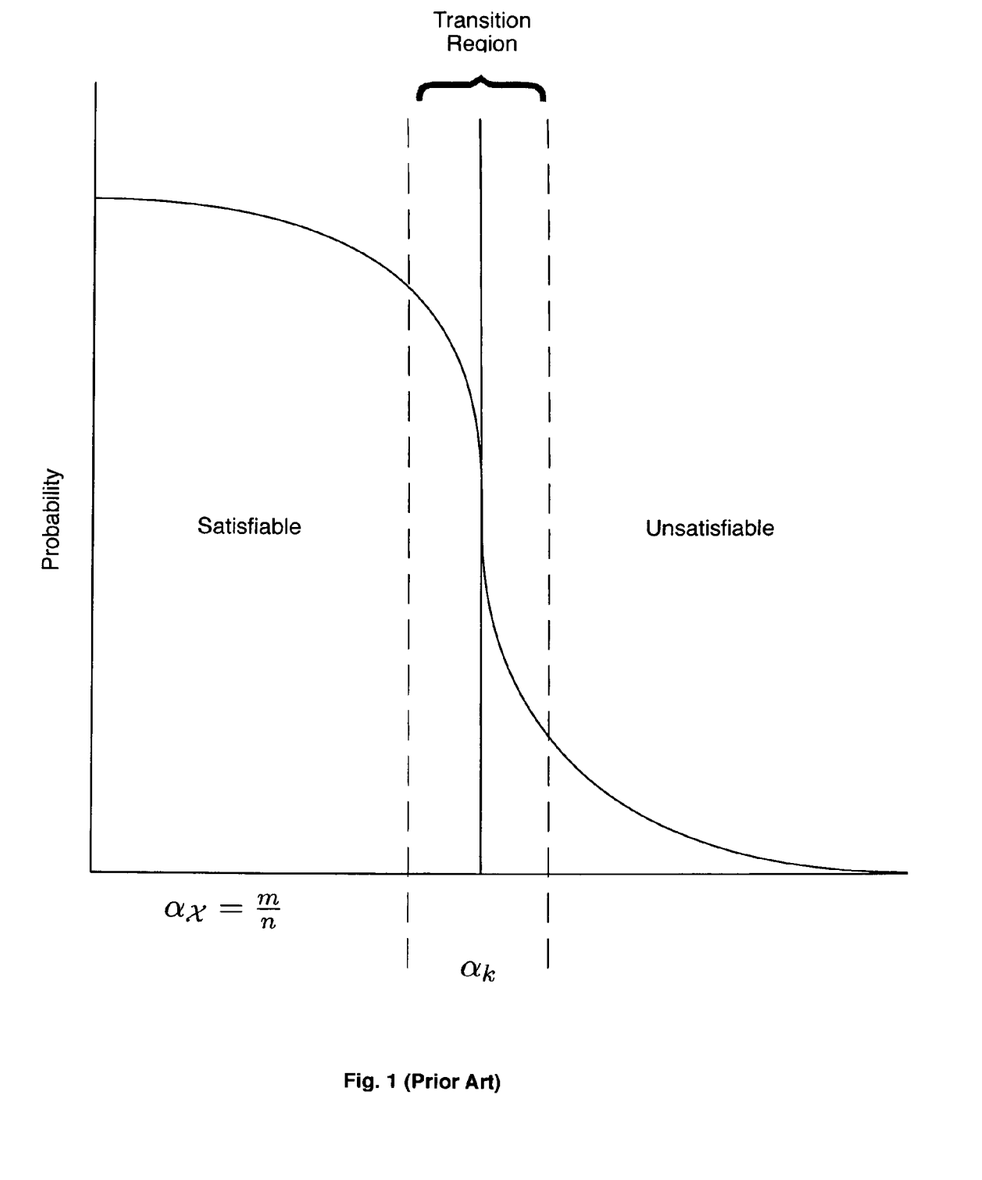
FIG. 1 is a graph illustrating the relationship between the probability of solving a SAT instance and the ratio of the size of the data set to the integers utilized to represent members of the set.

FIG. 1 provides a graph illustrating the relationship between the ratio m/n and the probability of solving a SAT instance. The ratio $\alpha_\chi$ is provided on the horizontal axis of the graph and the probability of solving a SAT instance is plotted on the vertical axis of the graph. As illustrated, with m/n near 0, the probability of solving a SAT instance is high. As m/n increases, the probability of solving a SAT instance remains high until a threshold, $\alpha_k$, is reached. Once m/n exceeds this threshold, the probability of solving a SAT instance is greatly reduced, i.e. SAT instances transition from satisfiable to unsatisfiable. Thus, the threshold $\alpha_k$ defines a satisfiable region for those instances where $\alpha_\chi < \alpha_k$, an unsatisfiable region where $\alpha_\chi > \alpha_k$, and a transition region which lies between the satisfiable region and the unsatisfiable region.

In addition to these theoretical results that prove the bound on the growth of $\alpha_k$ but do not provide its closed form, experimental results have established values of $\alpha_k$ for some specific B and small values of k. For example, when the Boolean function B is disjunction, as in the example above, the following values for $\alpha_k$ provided in Table 1 have been determined for each of the following values of k.

TABLE 1

Random k-SAT phase transition for various k.

| k | 1 | 2 | 3 | 4 | 5 | 6 | 7 |
|---|---|---|---|---|---|---|---|
| $\alpha_k$ | 0 | 1 | 4.26 | 9.93 | 21.11 | 43.37 | 87.79 |

Thus, as k increases, the threshold $\alpha_k$ increases, thereby increasing the ability to satisfy the SAT instance. As noted in the table above, for example, for k=3 the threshold is reached when the ratio m/n reaches≈4.26.

There is a need, therefore, for a filter that can be queried quickly like the Bloom filter but which provides greater efficiency than the Bloom filter or the compressed Bloom filter. Although domain constraint satisfaction problems provide methods for determining if the variables of a given Boolean formula can be assigned in such a way as to satisfy a formula, they do not provide a filter which allows set membership to be determined.

SUMMARY OF THE INVENTION

Briefly, the present invention provides a filter which approaches the information-theoretic limit while maintaining fast queries. The filter of the present invention utilizes finite domain constraint satisfaction problems and therefore has been termed a "satisfiability filter." The present invention utilizes domain constraint satisfaction problems to create a filter (i.e., a satisfiability filter or SAT filter). The SAT filter of the present invention utilizes random k-SAT instances to allow a user to perform a primary test for set membership. Once built, the SAT filter is queried to allow a user to examine a set of interest Y provided by a domain D, ($Y \subseteq D$), in an effort to determine if an element, x ($x \in D$), is a member in the set of interest, Y. For example, D, may be the set of all strings in the English alphabet and Y may be the set of all words defined in a given dictionary. The SAT filter may be utilized to determine if a string of characters, x, is a word defined in the dictionary.

BRIEF DESCRIPTION OF THE DRAWINGS

The organization and manner of the structure and operation of the invention, together with object and advantages thereof, may best be understood by reference to the following description, taken in connection with the accompanying drawings, wherein like reference numerals identify like elements in which.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Building the Sat Filter

Phase 1—Creating a Conjunction of Equations $\chi_Y$

Figure 2:
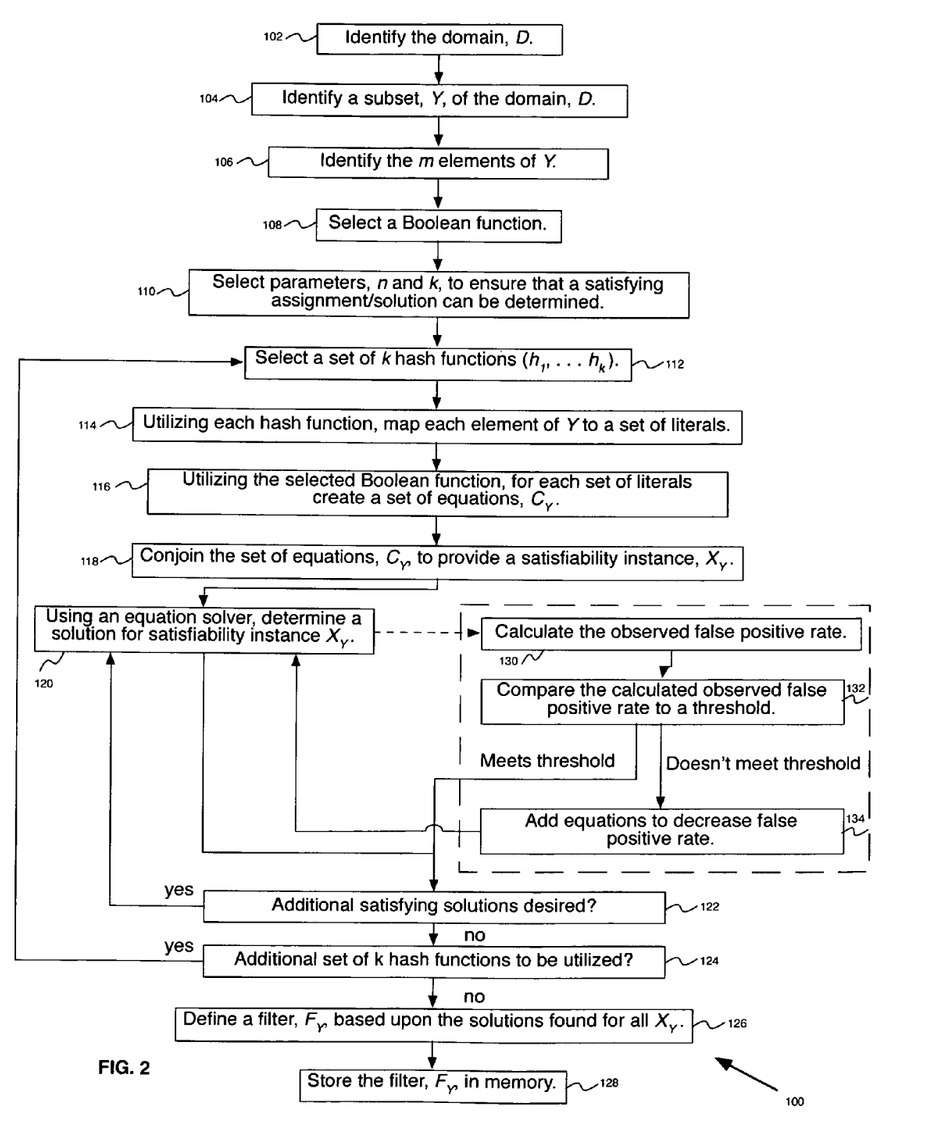
FIG. 2 is a flow chart illustrating the method of the present invention for building a SAT filter.

The method of building a SAT filter 100, $F_Y$, is illustrated in FIG. 2. As illustrated, the process begins at step 102 wherein the domain to which the filter will be applied is defined. Next, at step 104 a subset, Y, of the domain D is identified. The subset Y includes the elements $y_1, y_2, \ldots y_m$. Next, at step 106, the number of elements of Y, m, are identified as provided by the subset Y (|Y|=m).

At step 108, the Boolean function B which is to be used for creation of the SAT filter, $F_Y$, is identified.

At step 110, the integers n and k are selected. The integer n represents the number of variables provided by each SAT instance and thus the amount of memory available to store the SAT filter. The integer k represents the number of literals associated with each equation. Selection of the integers n and k is discussed below in further detail.

At step 112, at least one set of k hash functions, $\{h_1, h_2, \ldots h_k\}$ to be associated with each element, $y_i \in Y$, is selected.

At step 114, each hash function is used to map each element, $y_i \in Y$, to a set of literals $\{l_1, l_2, \ldots l_k\}$. The hash functions are selected to map each element of Y uniformly at random to the set of literals where k represents the number of hash functions associated with each element and therefore the resulting number of literals associated with each element. For example, the set of hash functions $\{h_1, h_2, \ldots h_k\}$ are associated with element $y_1$ to provide the set of literals $\{l_{1,1}, l_{1,2}, l_{1,k}\}$ and the same set of hash functions $\{h_1, h_2, \ldots h_k\}$ are associated with element $y_2$ to provide the set of literals $\{l_{2,1}, l_{2,2}, \ldots l_{2,k}\}$. Each literal l is provided by a Boolean variable or its negation (NOT). A pair of literals is said to be complementary if both are the same variable but have different signs, i.e., $x_i$ and $\overline{x_i}$, are complementary literals, Specifically, $$\overline{l_i} = \begin{cases} \overline{x_i} & \text{if } l_i = x_i \\ x_i & \text{if } l_i = \overline{x_i} \end{cases}$$

The literals are represented by integers ranging from −n to n, exclusive of 0.

At step 116, for each $y_i \in Y$, the set of literals is provided to the Boolean function selected at step 108 to create an equation $C_i$.

$$C_i = B(l_{i,1}, \ldots, l_{i,k_i}),$$

where $C_i$ has a width k, if it has exactly k distinct literals and no pair is complementary. One way to ensure that this property holds is to add a nonce as input to each hash function that can modify the output of the hash function to ensure that only width k equations are generated. Algorithm 1 is an example of an algorithm which may be used to ensure the literals of the set of equations, $C_Y$ are distinct and no pair is complementary.

---

Algorithm 1 ELEMENTTOSETOFLITERALS(y ∈ D , n, k, $h_1$, . . . , $h_k$)
k is the number of literals per clause
$h_1$, . . . $h_k$ are functions that map elements of D to [−n, n]\{0}

1:  repeat
2:      C: { } empty set of literals
3:      for i := 1 to k nonce i : = 0 do
4:          l := $h_i$ (y , nonce)
5:          C := C ∪ {l}
6:      end for
7:      nonce := nonce + 1
8:  until all literals of C are distinct and no pair is complementary
9:  return C

---

Thus, the hash functions map each element of Y uniformly at random into a set of literals that when provided to the Boolean function constitute a random equation of width k. For example, if the identified Boolean function is logical disjunction, the literals are provided to the disjunction function to provide the equation $C_i$ as follows:

$$C_i = l_{i,1} \vee l_{i,2} \ldots \vee l_{i,k_i}$$

for each $C_i$, 1≤i≤m, where the symbol V represents logical disjunction (OR). When applying the logical disjunction function to the literals, for example, the set of literals relating to element, $y_1$, is provided to the function to provide an equation $C_1$ and the set of literals relating to element, $y_2$, is provided to the function to provide an equation $C_2$. In this manner, a set of equations $C_Y$ including the equations, $C_1$, $C_2$, . . . $C_m$ is associated with the set of elements $y_1$, $y_2$ . . . $y_m$.

Another Boolean function which may be selected at step 108 is EXCLUSIVE OR (⊕). When providing the literals to the EXCLUSIVE OR function, the resulting equation from step 116, $C_i$, may be expressed as follows:

$$C_i = l_{i,1} \oplus l_{i,2} \ldots \oplus l_{i,k_i}$$

Yet another Boolean function which may be selected at step 108 is NOT ALL EQUAL (NAE). When providing literals to the NAE function, the equation, $C_i$, provided at step 118 may be expressed as follows:

$$C_i = (l_{i,1} \vee l_{i,2} \ldots \vee l_{i,k_i}) \wedge (\overline{l_{i,1}} \vee \overline{l_{i,2}} \ldots \vee \overline{l_{i,k_i}})$$

Once the set of equations, $C_Y$, has been determined, at step 118 the equations of the set $C_Y$ are conjoined utilizing the Conjunctive Normal Form (CNF), or an equivalent formula, to provide a random k-SAT instance, $\chi_Y$.

$$\chi_Y = C_1 \wedge \ldots \wedge C_m,$$

where the symbol ^ represents logical conjunction (AND) and 1≤i≤m. A random k-SAT instance is a conjunction of equations drawn uniformly, independently, and with replacement from the set of all width k equations. Because |Y|=m, each SAT instance provides m number of equations.

As described above, the Bloom filter is also created utilizing hash functions, however, construction of the Bloom filter is significantly different than construction of the SAT filter of the present invention. The Bloom filter utilizes hash functions to map each element of Y to a series of integers. Each integer is associated with a position in an array. If an element of Y is mapped to a particular position, the bit at that position is changed from 0 to 1 to designate set membership.

In the SAT filter of the present invention, however, hash functions are utilized to map each element to a set of literals. The literals are then used to create a set of equations associated with each element of Y. These equations are then conjoined to create a SAT instance.

Phase 2—Finding a Solution for $\chi_Y$

Once the SAT filter has been built, at step 122 a satisfying assignment (also called a "solution") for $\chi_Y$ is found. An assignment v is a function from the set of variables Vars (|Vars|=n) into the set Bool, i.e. {0, 1}. An assignment v satisfies a variable $x_i$ if $v(x_i)=1$ and v satisfies $\overline{x_i}$ if $v(x_i)=0$. An assignment v satisfies an equation $C_i$ if $B(v(l_{i,1}), \ldots, v(l_{i,k_i}))=1$ and satisfies a constraint satisfaction problem (e.g. $X_Y = C_1 \wedge \ldots \wedge C_m$), if v satisfies all $C_i$, 1≤i≤m.

For example, if the selected Boolean function is logical disjunction:

$$C_i = l_{i,1} \vee \ldots \vee l_{i,k_i},$$

where the symbol v represents logical disjunction (OR), then an assignment v satisfies $C_i$ if for some j, $1 \leq j \leq k_i$, $v(l_{i,j})=1$.

A solution to the conjunction of equations may be found using an equation solver. The particular equation solver used is irrelevant, so long as the equation solver is capable of solving moderate-to-large satisfiable random k-SAT instances. For example, the equation solver may be a SAT solver such as, for example, SBSAT, Dimetheus, and Walk-SAT.

Algorithm 2 is an example of an algorithm which may be used to build a SAT filter including a satisfiable k-SAT instance, $\chi_Y$.

---

Algorithm 2 BUILDSATFILTER(Y ⊆ D, n, k, B, $h_1$, . . . , $h_k$)
n is the amount of memory available to store the SAT filter $F_Y$, namely |$F_Y$|
k is the number of literals per equation
B is a Boolean function
$h_1$, . . . , $h_k$ are functions that map elements of D to [−n, n ]\{0}

1:  m := |Y|
2:  $C_Y$ := { }, the empty formula
3:  for each element y ∈ Y do
4:      $C_y$ := B(ELEmENTTOSETOFLITERALS(y, n, k, $h_1$, . . ., $h_k$))
5:      $C_Y$ := $C_Y$ ∪ {$C_y$}
6:  end for
7:  $X_Y$ = ⋀ $C_Y$
8:  if the random k-SAT instance $X_Y$ is unsatisfiable then
9:      return maybe
10: else
11:     Let $F_Y$ be a solution to $X_y$
12:     return $F_Y$
13: end if

---

The false positive rate of the filter can be improved by utilizing the equation solver to find multiple ($S_1$) solutions to the SAT instance. At step 122 it is determined whether multiple solutions to the SAT instance are desired. If multiple solutions to the SAT instance are desired, the process returns to step 120 and the equation solver is again used to determine a new solution. Once the desired number of solutions to the SAT instance have been found, the process proceeds to step 124.

The false positive rate of the filter may be improved by utilizing multiple sets of hash functions to generate multiple ($s_2$) SAT instances to be satisfied. At step 124 a determination is made as to whether an additional set of k hash functions is to be utilized. If an additional set of k hash functions is to be utilized the process returns to step 112 and an additional set of k hash functions is selected. When $s_2$ sets of hash functions are used, $s_2$ set of equations are generated, resulting in $s_2$ SAT instances. The equation solver is then used to find $s_1$ solutions to each of the $s_2$ SAT instances. Thus, the total number of solutions, s, used to define the filter can be found with:

$$s=s_1 * s_2$$

When querying the SAT filter to test for set membership, as described below, the equation $C_x$ must be satisfied by each of the $s_i$ solutions to the corresponding SAT instance in order to provide a result of maybe. Therefore, each of the solutions is stored in long term memory in order to perform the query. Thus, the amount of long term storage required to store the solutions will be n*s. The benefit of using multiple solutions to improve the false positive rate is that query time is not negatively impacted. Because only $s_2$ equations are generated per query, each equation can be checked against all $s_1$ solutions in parallel using bit-packing and word-level operations. To accomplish parallel checking, however, the solutions need to be stored such that all $s_i$ solution bits corresponding to a variable are stored together.

When it is determined at step 124 that the desired number of sets of k hash functions have been selected and utilized, the process proceeds to step 126.

Phase 3—Creating the Filter $F_Y$

At step 126, a filter based upon the s solution(s) is created. Specifically, the $s_1$ solution(s) to each of the $s_2$ k-SAT instance(s) $\chi_Y$ discovered by the equation solver are provided as an array of bits, $F_Y$. If multiple k-SAT instances are provided, an array will be associated with each k-SAT instance. The array(s), $F_Y$, represents the SAT filter of the present invention.

Next, at step 128, the array(s) of bits associated with $F_Y$ is stored. The array of bits may be stored such that the value of $x_1$ in solution 1 is stored at index 1, the value of $x_2$ in solution 1 is stored at index 2, and so on. Alternatively, the array of bits may be transposed, i.e., the first $s_1$ bits of the array correspond to the values of variable $x_1$ (either 1 or 0) in each of the $s_1$ solutions, and the next $s_1$ bits correspond to the values of variable $x_2$, and so on. The advantage of providing a transposed array is that the bit-packed values may be queried in parallel using word level operations thereby significantly decreasing query time.

It is noted that providing multiple solutions to a single SAT instance may not decrease the false positive rate if the solutions are not independent, i.e. the improvement to the false positive rate depends on how different the solutions are from one another. Thus, if multiple solutions to the SAT instance are found in order to improve the false positive rate, the specific equation solver used must be capable of finding disparate solutions to the same SAT instance. If at step 122 it is determined that multiple solutions to the SAT instance are to be found, the process may include steps for determining whether the solutions are disparate. These optional steps 130, 132, 134 are illustrated in FIG. 2. At step 130, a realized false positive rate is calculated. At step 132, the realized false positive rate is compared to a threshold. If the realized false positive rate meets the threshold, the solution is accepted and the process proceeds to step 122. If based upon the newly determined solution the realized false positive rate falls below the threshold, at step 134 equations are added to the SAT instance to block the parts of the recently-determined solution most similar to the previously accepted solution. The process then returns to step 122.

Figure 3:
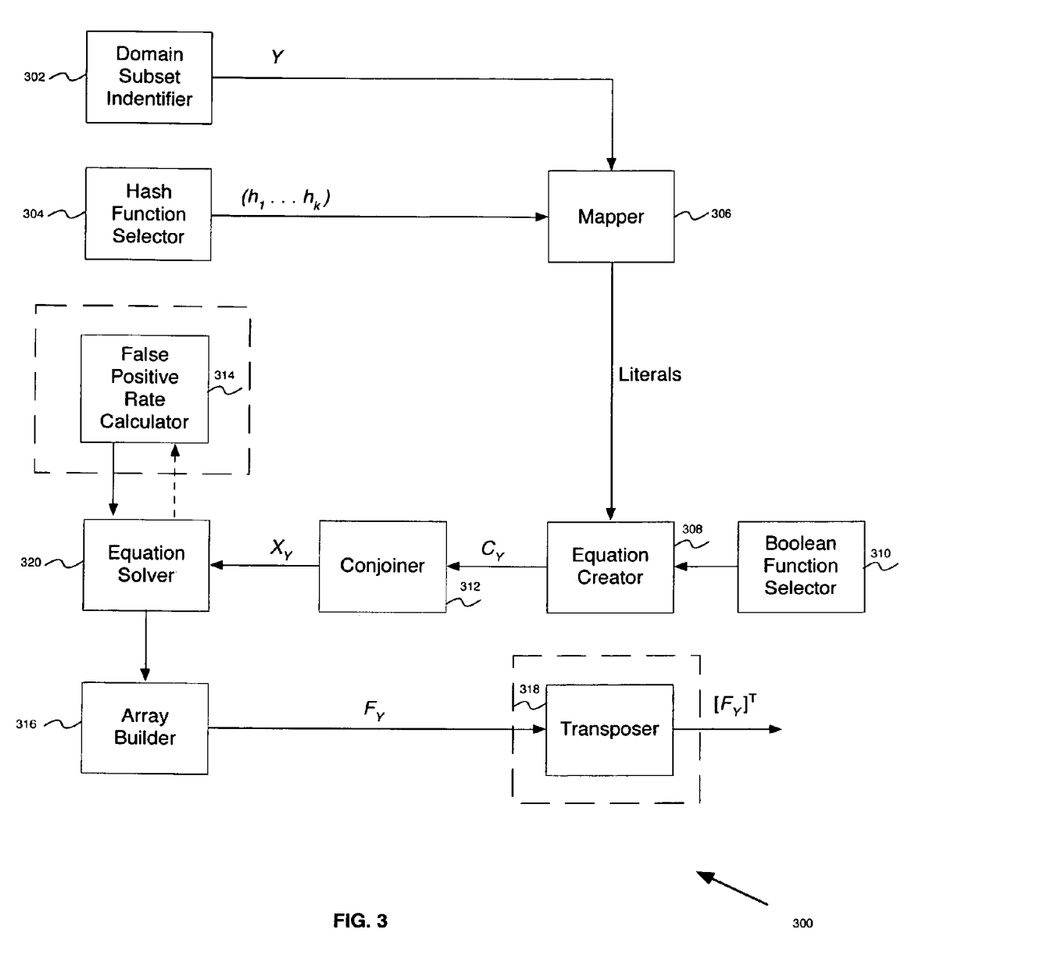
FIG. 3 is a block diagram illustrating the SAT filter builder of the present invention.

FIG. 3 illustrates the SAT filter builder of the present invention. The SAT filter builder 300 generally includes a domain subset identifier 302, a hash function selector 304, a mapper 306, an equation builder 308, a Boolean operation selector 310, a conjoiner 312, an optional false positive rate calculator 314, an array builder 316, and an optional transposer 318. The SAT filter builder 300 communicates with an equation solver 320.

The domain subset identifier 302, identifies the subset Y of a domain D and provides this subset Y on an output of the identifier 302.

The hash function selector 304 includes an input and an output. The input of the selector 304 receives information from a user regarding the hash functions to be applied to the subset Y of the domain D. The hash function selector 304 further includes an output on which a set of hash functions, $\{h_1, h_2, \ldots h_k\}$, is provided.

The mapper 306 includes a first input, a second input and an output. The first input of the mapper 306 is in communication with the output of the domain subset identifier 302 for receiving the domain subset Y from the domain subset identifier 302. The second input is in communication with the hash function selector 304 and receives the set of hash functions provided by the hash function selector 304. The mapper 306 maps elements of the subset Y of the domain D to a set of literals utilizing the identified set of hash functions. The literals are provided at the output of the mapper 306.

The Boolean operation selector 310 includes an input from which a user may define the Boolean operation to be implemented by the SAT filter builder 300 and an output on which the selected Boolean operation is output.

The equation creator 308 includes a first input, a second input and an output. The first input is in communication with the output of the mapper 306 and receives the literals provided by the mapper 306. The second input is in communication with the Boolean operation selector 310 and receives identification of the Boolean operation to be applied to the literals. The equation creator 308 combines the literals utilizing the selected Boolean operation to provide a set of equations, $C_Y$ at the output of the equation creator 308.

The conjoiner 312 includes an input in communication with the output of the equation creator 308. The conjoiner 312 receives the set of equations $C_Y$ and conjoins the equations of the set to provide a SAT instance $\chi_Y$ at the output of the conjoiner 312.

The SAT filter builder 300 optionally includes a false positive rate calculator 314. Solutions to the SAT instance $\chi_Y$ may be provided to the false positive rate calculator 314 for the purpose of determining whether multiple solutions provided by the equation solver 320 are sufficiently disparate as described above.

The SAT filter builder 300 is in communication with the equation solver 320 via the output of the conjoiner 312. The equation solver 320 includes an input in communication with the output of the conjoiner 312. The equation solver 320 receives the SAT instance $\chi_Y$ and finds a solution to the SAT instance $\chi_Y$. The solution to the SAT instance is provided to the SAT filter builder 300 via the array builder 316.

The array builder 316 includes an input and an output. The input of the array builder 316 is in communication with the output of the equation solver 320 and receives the solution from the equation solver 320. The array builder 316 builds an array based upon the solution provided by the equation solver and provides an array on the output of the array builder 316 representing the filter F.

The optional transposer 318 includes an input in communication with the output of the array builder 316 and an output. The transposer receives the array from the array builder 316 and transposes the array. The transposed array is provided on the output of the transposer 318 as the filter, $F_Y$ in the transposed form $[F_Y]^T$. Transposition of the array provided by the array builder 316 is not required, therefore, the transposer 318 has been identified as optional.

It is noted that the set of equations $C_Y$ and the SAT instance(s) $\chi_Y$, can be discarded once a solution has been found. Hence, the amount of long term storage required to store a solution is $n*s_1*s_2$ bits. In general, this amount of memory is small compared to the memory required to fully specify the original data set.

An asymptotic analysis of the SAT filter may be performed. During this analysis we assume that the SAT filter is using disjunction as its Boolean function, and note that this analysis can be successfully performed using other Boolean functions.

For a given element $x \in D$, to pass a SAT filter comprised of the $s_1$ solutions to $s_2$ random-k SAT instances, where the Boolean function B is disjunction, means that at least one of the k literals in each of x's corresponding $s_2$ equations is set to 1. For each literal in the equation there is a ½ chance that a random solution provides that the filter is set to 1. So the false positive rate, i.e. the probability of passing x is $$p=(1-2^{-k})^s.$$

A SAT filter uses n*s bits of long term memory. Therefore, the efficiency of such a SAT filter is $$\varepsilon = \frac{-\log_2((1-2^{-k})^s)}{sn/m}$$
$$= \frac{-\log_2(1-2^{-k})}{n/m}.$$

As noted above, the selection of the variable n, and k along with the selection of the Boolean function to be applied to the literals will impact the performance of the filter. In order for the filter to function appropriately, the range of integers, n, used to represent the size of the filter and the number of literals associated with each hash function, k, must be chosen appropriately based upon the size m of the domain Y. If n is too small or k is too large, all the bits associated with the filter $F_Y$ could essentially become set to 1. As a result, the filter will rarely reject when queried (i.e. the filter will have a high false positive rate), rendering $F_Y$ useless.

As previously described in connection with SAT instances, the ratio m/n (i.e. $\alpha_{\chi_Y}$) must be selected carefully so that the problem is solvable in practice. Although the ability to solve a SAT instance is equation solver-dependent, there are theoretical bounds that determine, with high probability, whether or not a random k-SAT instance is satisfiable, i.e., that a random k-SAT filter can be built. With respect to k-SAT instances, it has been previously shown that if:

$$m/n < 2^k \ln 2 - O(k),$$

then as k, n, m→∞, a random k-SAT instance with n variables and m equations is almost surely satisfiable, and unsatisfiable otherwise. That is, as k gets large, a large random k-SAT instance with $m/n < 2^k \ln 2 - O(k)$ is satisfiable. Applying this to the present invention, in order to maximize the efficiency of a SAT filter, therefore, m/n should be as large as possible while keeping the random k-SAT instance satisfiable. Thus, a lower boundary is defined, i.e., if $m/n = 2^k \ln 2 - k$, it is probable that the equation is satisfiable. Utilizing this calculation for m/n in the above efficiency formula provides the following estimate of the efficiency of a SAT filter:

$$\varepsilon = \frac{-\log_2(1-2^{-k})}{n/m}$$
$$\geq -(2^k \ln 2 - k) \log_2(1-2^{-k}).$$

A simple calculus argument shows that the expression on the right tends to 1 as k tends to infinity. Therefore, such SAT filters can achieve the information-theoretic limit.

Since the first derivative of this SAT filter efficiency function is always positive, SAT filter efficiency is a monotonically increasing function. Thus, efficiency increases as k increases. Theoretically achievable SAT filter efficiency for various values of k are provided in the table below. As also illustrated in Table 2, as k increases, the rate at which the efficiency increases is reduced. As a result, there is not a specific value of k that will maximize SAT filter efficiency, but as k grows there is a diminishing return on the efficiency provided. Thus, the value of k need only be relatively small (e.g. five or six) to achieve near optimal efficiency.

TABLE 2

Theoretically achievable disjunctive SAT filter efficiency for various k.

| | k | | | | |
|---|---|---|---|---|---|
| | 3 | 4 | 5 | 6 | 7 |
| $\alpha_k$ | 4.26 | 9.93 | 21.11 | 43.37 | 87.79 |
| E | 0.82 | 0.92 | 0.96 | 0.98 | 0.99 |

Parameters of the SAT filter, $F_Y$, may be defined to meet specific performance requirements. The size of the data set m=|Y| is typically assumed to be given. Thus, the remaining SAT filter parameters will be defined based upon the filter requirements. For example, in some scenarios a user may be presented with limited memory for storing the filter. In other scenarios, the user may be presented with a false positive rate threshold which must be accomplished.

In some instances, filter requirements may dictate a value for k, i.e., the number of hash functions to be applied to each element to provide a set of literals. As discussed below, keeping the value of k low is beneficial because as k increases, the amount of time required to query the SAT filter increases. As stated earlier, a small k (say five or six) is sufficient to achieve near perfect efficiency.

With a value for k selected and the value for m known, a value for n (i.e., the range of integers associated with each literal) is determined. In determining a value for n, the user must balance the desire to reduce n (thereby reducing the size of the long term memory needed to store the filter), with the need to provide a high probability of the SAT instance being satisfiable (i.e., as n increases, the probability of satisfying the SAT instance increases but as n is increased more long term memory is required to store the filter). As $\alpha_{\chi_Y}$ increases to approach $\alpha_k$, the harder the SAT instance is for an equation solver to solve. The ability to solve random satisfiable k-SAT instances within the phase transition allows filters to be built that use a small amount of long term storage while achieving high efficiency. The ability to solve k-SAT instances within the phase transition is determined by the power of the equation solver. Letting $\alpha_{\chi_Y} = e\alpha_k$, where $0 \le e \le 1$ corresponds to the power of the equation solver being used, n can be determined as follows, $$n = \frac{m}{e\alpha_k}.$$

In addition to determining values for n, both s and p should be selected. These parameters bring about a trade-off between the amount of long term storage (n*s) and the false positive rate. The lower the false positive rate, the higher the amount of long term storage. The lower the amount of long term storage, the higher the false positive rate.

If the amount of long term storage is known, the false positive rate, p, can be determined as follows, $$p = (1 - 2^{-k})^s.$$

If, instead, the false positive rate is known, the amount of long term storage needed can be determined by first determining the total number of solutions, s, needed as follows, $$s = \left\lceil \frac{\log_2 p}{\log_2(1 - 2^{-k})} \right\rceil.$$

The amount of one-time memory needed (in bits) to build all SAT instances simultaneously for a given filter is (assuming 64-bit integers are used to represent literals)

64 kms.

If enough memory is available to hold all the SAT instances, they can be solved in parallel, otherwise they can be solved sequentially. Although the previous equation shows the memory necessary to store the equations for all SAT instances, there is typically additional memory needed for other SAT solver data structures (such as an occurrence list or incidence graph) that can cause this number to grow by an order of magnitude while a SAT solver is at work.

Note that, like a Bloom filter, the every-time work for a SAT filter (i.e., the query work) can be performed rather quickly. Unlike a Bloom filter, however, SAT filters can be queried quickly while achieving high efficiency. Thus, although building a SAT filter requires more one-time work than a Bloom filter, this is typically not critical as many common applications spend far more time querying than building.

It is noted that although utilizing additional ($s_2$) SAT instances improves the false positive rate, query speed is somewhat decreased because $k*s_2$ hashes are computed. It is further noted, however, that all but one of the hash functions may be simple. For example, a set of hashes may include $h_i(x) = h_1(x) + ih_2(x)$ for $3 \le i \le k$.

Examples of filters built utilizing the present invention are detailed in Table 3. Specifically, four dictionaries were built consisting of $2^{14}$, $2^{15}$, $2^{16}$, and $2^{17}$ random strings. To ensure that random k-SAT instances were generated, the strings were transformed into disjunctive clauses using the MurmurHash3 hash function combined with a technique described by Adam Kirsch and Michael Mitzenmacher in 'Less Hashing, Same Performance: Building a Better Bloom Filter'. Specifically, the set of hashes $h_i(x) = h_1(x) + ih_2(x)$ for $3 \le i \le k$ were used without increasing the false positive rate of the filter. Next, utilizing the present invention, disjunctive SAT filters were built for k=3 ... 6 with $p \approx \frac{1}{4}$ and $\alpha_{x,y}$, (i.e. m/n) set according to a range of efficiency values. Table 3 presents the time taken to build multi-instance SAT filters, i.e. $s_2$ SAT instances were generated per filter and one solution was found for each. The SAT instances were solved sequentially using a dovetailing of Dimetheus and WalkSAT. Because Dimetheus does not work well (without tuning) when m/n was significantly less than the threshold, WalkSAT was used to solve the random k-SAT when m/n was significantly less than the threshold. For clarity, run-times of Dimetheus are provided in bold-faced text and run-times of WalkSAT are provided in plain text. All results were collected using an early 2009 MacBook Pro with a 3.06 GHz Intel Core 2 Duo processor and 4 GB of RAM. All times are reported in seconds. All sizes are reported in bits. The symbol "-" is used to denote that the filter could not be built within 2000 seconds. The vertical bar represents the location of the random k-SAT threshold for each k.

As noted earlier, the Bloom filter achieves an efficiency of approximately 0.693. The results illustrated in Table 3 demonstrate that SAT filters can be built with an efficiency near the information-theoretic limit (1.0). Although SAT filter

TABLE 3

| Seconds taken to build SAT filters for $p \approx \frac{1}{4}$ | | | | | | | | | | | | |
|---|---|---|---|---|---|---|---|---|---|---|---|---|
| ξ | 0.75 | 0.77 | 0.79 | 0.81 | 0.83 | 0.85 | 0.87 | 0.89 | 0.91 | 0.93 | 0.95 | 0.97 |
| k = 3, $s_2$ = 11 → p ≈ 23.02% | | | | | | | | | | | | |
| m = $2^{14}$ | 1 | 1 | 2 | 137 | — | — | — | — | — | — | — | — |
| m = $2^{15}$ | 1 | 3 | 15 | 101 | — | — | — | — | — | — | — | — |
| m = $2^{16}$ | 2 | 6 | 67 | 101 | — | — | — | — | — | — | — | — |
| m = $2^{17}$ | 7 | 17 | 116 | 120 | — | — | — | — | — | — | — | — |
| k = 4, $s_2$ = 22 → p ≈ 24.18% | | | | | | | | | | | | |
| m = $2^{14}$ | 1 | 1 | 1 | 1 | 1 | 2 | 6 | 39 | — | — | — | — |
| m = $2^{15}$ | 1 | 1 | 1 | 2 | 2 | 9 | 19 | 62 | — | — | — | — |
| m = $2^{16}$ | 1 | 2 | 2 | 4 | 10 | 26 | 36 | 71 | — | — | — | — |
| m = $2^{17}$ | 4 | 5 | 7 | 11 | 25 | 62 | 74 | 144 | — | — | — | — |
| k = 5, $s_2$ = 44 → p ≈ 24.74% | | | | | | | | | | | | |
| m = $2^{14}$ | 1 | 1 | 1 | 1 | 4 | 33 | 183 | 285 | 1436 | — | — | — |
| m = $2^{15}$ | 1 | 1 | 2 | 4 | 21 | 96 | 97 | 117 | 349 | — | — | — |
| m = $2^{16}$ | 3 | 3 | 5 | 8 | 71 | 211 | 219 | 222 | 548 | — | — | — |
| m = $2^{17}$ | 7 | 9 | 14 | 23 | 471 | 484 | 499 | 517 | 626 | — | — | — |

TABLE 3-continued

Seconds taken to build SAT filters for p ≈ ¼

| ξ | 0.75 | 0.77 | 0.79 | 0.81 | 0.83 | 0.85 | 0.87 | 0.89 | 0.91 | 0.93 | 0.95 | 0.97 |
|---|---|---|---|---|---|---|---|---|---|---|---|---|
| k = 6, $s_2$ = 89 → p ≈ 24.62% | | | | | | | | | | | | |
| m = $2^{14}$ | 1 | 2 | 6 | 29 | 54 | 68 | 115 | 235 | — | — | — | — |
| m = $2^{15}$ | 3 | 11 | 105 | 105 | 110 | 123 | 167 | 389 | — | — | — | — |
| m = $2^{16}$ | 7 | 79 | 250 | 251 | 258 | 268 | 324 | 671 | — | — | — | — |
| m = $2^{17}$ | 21 | 555 | 567 | 569 | 579 | 604 | 640 | 1283 | — | — | — | — | build times appear large (as compared to Bloom filters), achieving higher efficiency (less long term storage) at the expense of more one-time work is often acceptable.

The SAT filters built were evaluated to determine whether the desired false positive rate was achieved. Specifically, each SAT filter was queried with $2^{27}$ random elements and the realized false positive rate was compared with the desired false positive rate. This evaluation illustrated that the SAT filters achieved the desired false positive rate.

Table 4 provides a comparison between the sizes of the smallest SAT filters built versus optimal Bloom filters built using the same data set and false positive rate.

Table 4 provides a comparison between pairs of Bloom filters and SAT filters. Each pair was built with optimal parameters given the same dictionaries and false positive rate. As illustrated in Table 3, a SAT filter with a false positive rate of p≈¼ and k=5 needs s=44 total solutions to achieve an efficiency of 0.91 utilizing

TABLE 4

Bloom filter size versus SAT filter size (in bits).

| | m = $2^{14}$ | | m = $2^{15}$ | | m = $2^{16}$ | | m = $2^{17}$ | |
|---|---|---|---|---|---|---|---|---|
| | Bloom | SAT | Bloom | SAT | Bloom | SAT | Bloom | SAT |
| k = 3, s = 11 → p ≈ 23.02% | 50090 | 42856 | 100179 | 85734 | 200356 | 171446 | 400715 | 342914 |
| k = 4, s = 22 → p ≈ 24.18% | 48419 | 37708 | 96837 | 75416 | 193674 | 150832 | 387348 | 301664 |
| k = 5, s = 44 → p ≈ 24.74% | 47638 | 36256 | 95275 | 72556 | 190550 | 145112 | 381099 | 290268 |
| k = 6, s = 89 → p ≈ 24.62% | 47797 | 37202 | 95593 | 74404 | 191186 | 148897 | 382371 | 297794 |

The s and k parameters are only applicable to the SAT filters.

current equation solvers. If m=$2^{16}$, the SAT filter will use n=145112 bits of long term storage. In comparison, an equivalent optimal Bloom filter requires n=190550 bits of longer term storage. Thus, an equivalent SAT filter with these parameters achieves a 23 percent reduction in size relative to the Bloom filter.

Filters requiring a small amount of long term storage, i.e. those having a small value for n will have a value for $\alpha_y$ closer to this phase transition than those with a larger n. These filters, therefore, provide greater efficiency.

Querying the SAT Filter

Once the SAT filter, $F_Y$, has been created, it can be queried to determine if element x is contained within the set Y. Each time an element is tested for membership in the data set, the filter must be queried. A method 200 of querying the SAT Filter is illustrated in FIG. 3.

Figure 4:
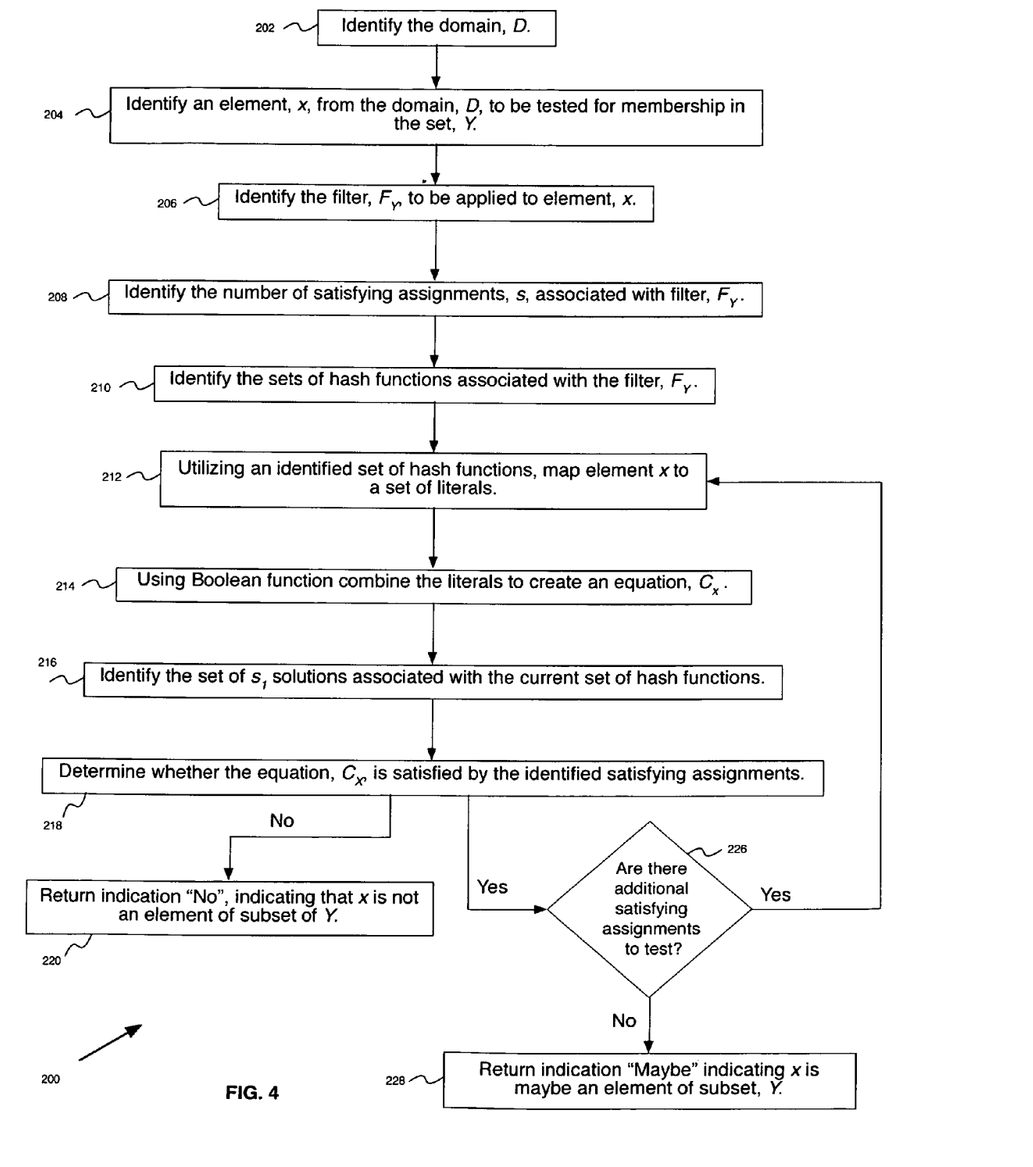
FIG. 4, is a flow chart illustrating the method of the present invention for querying a SAT filter.

The method 200 begins at step 202 by identifying the domain D. Next at step 204, element x, of the domain D is identified. Next at step 206, the filter $F_Y$ defined at step 126 in FIG. 2 is identified. Next, at step 208 the number of SAT instances $s_2$ associated with the filter $F_Y$ are identified.

Next, at step 210, the sets of hash functions associated with the identified SAT instance $\chi_Y$ are identified. At step 212, the identified set of hash functions are utilized to map the element x to a set of literals. Thus, the same hash functions utilized to map the elements, y, to a set of literals in step 114 of the method for building a filter illustrated in FIG. 2 are utilized at step 212.

At step 214, the literals are combined to create an equation $C_x$. The Boolean operation utilized to create the equation $C_x$ is the same Boolean operation utilized to create the equation $C_y$ at step 118 of the method for building a filter illustrated in FIG. 2. The equation $C_x$ has width k.

Next, at step 216, $s_1$ solutions associated with the SAT instance, $\chi_Y$, are identified. The solutions identified are based upon the filter defined at step 126 of the method for building a filter illustrated in FIG. 2.

At step 218, it is determined whether the equation $C_x$ is satisfied by the identified solutions. If at step 218 it is determined that the equation $C_x$ is not satisfied by the identified solutions, at step 220 the filter provides an indication of no (i.e. x is not a member of the set Y). Otherwise, if at step 218 it is determined that the equation $C_x$ is satisfied by the identified solutions, the method proceeds to step 226.

At step 226, it is determined whether there are additional solutions to be tested. If at step 226 it is determined that there are additional SAT instances to be tested, the process returns to step 212 where the set of hash functions associated with the next identified solutions is identified. If at step 226 it is determined that there are no additional solutions to be tested, the process proceeds to step 228 and the indication of maybe is returned. As noted above, the indication of maybe indicates that x may be a member of the set Y.

As noted above the array(s) defining the filter may be transposed. In the event the array(s) has not been transposed, each of the $s_1$ solutions will need to be tested against the equation $C_x$ to determine if the equation $C_x$ is satisfied by the identified solution.

Algorithm 3 below provides an example of an algorithm used to query the SAT filter. The Boolean function utilized to create the equation $C_x$ in Algorithm 3 is disjunction.

Figure 5:
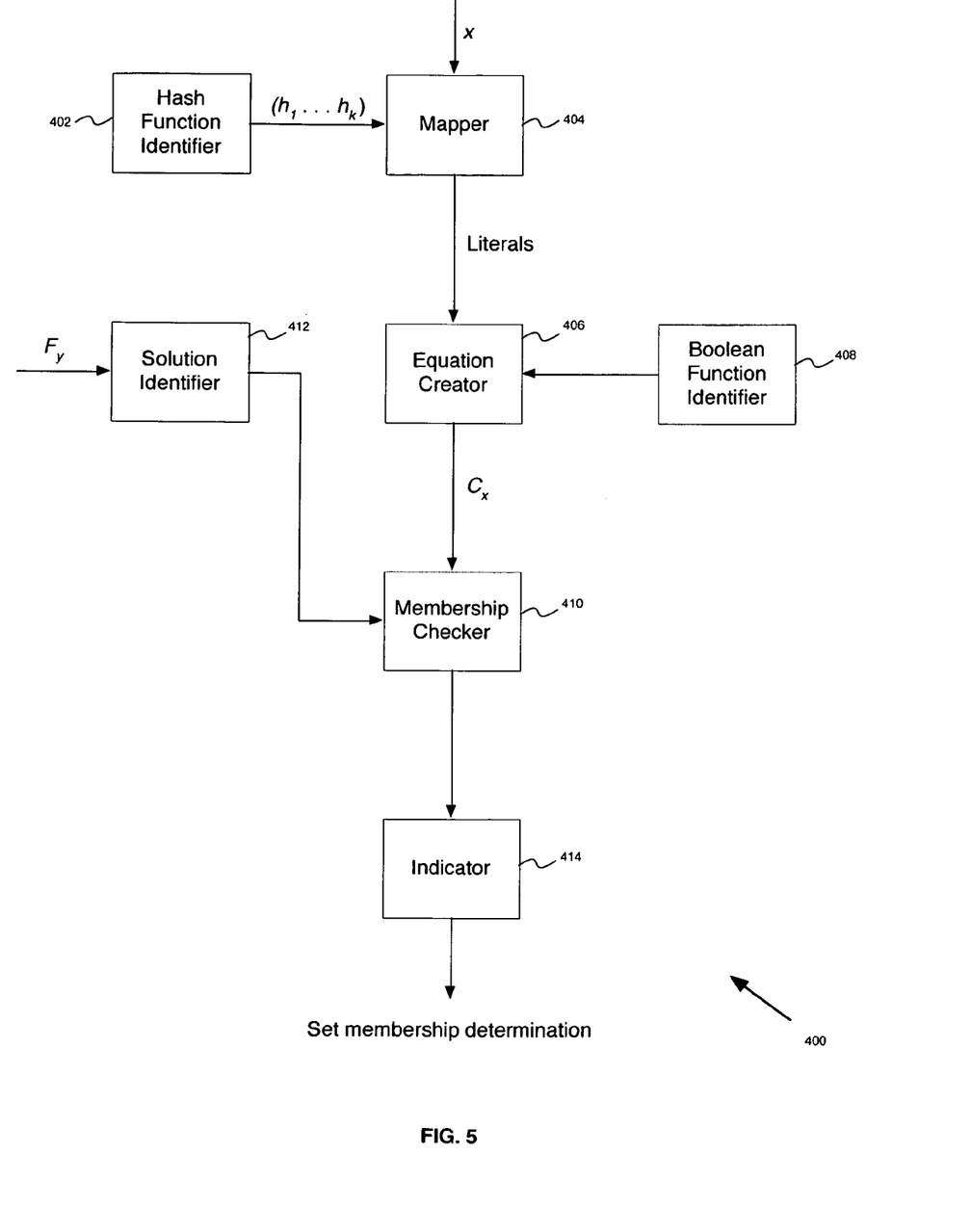
FIG. 5, is an illustration of the SAT filter query tool of the present invention.

A SAT filter query tool of the present invention is illustrated in FIG. 5. The query tool generally includes a hash function identifier 402, a mapper 404, an equation creator 406, a Boolean operation identifier 408, a membership checker 410, a solution identifier 412 and an indicator 414.

The hash function identifier 402 identifies the hash function utilized by the SAT filter builder in building each SAT instance $\chi_Y$. The hash function identifier includes an output on which the identified hash functions, $\{h_1, h_2, \ldots h_k\}$ are provided.

---

Algorithm 3 QUERYSATFILTER($S_Y$, x, n, k, $h_1, \ldots, h_k$)
n is the amount of memory available to store the SAT filter $S_Y$, namely $|S_Y|$
k is the number of literals per clause
$h_1, \ldots, h_k$ are functions that map elements of D to $[-n, n]\setminus\{0\}$

```
1:   nonce := 0
2:   repeat
3:      C_x := { }, the empty clause
4:      for i := 1 to k do
5:         lit := h_i (x , nonce)
6:         C_x := C_x ∪ {lit}
7:      end for
8:      nonce := nonce + 1
9:   until all literals of C_x are distinct and no pair is complementary
10:  for each lit in C_x do
11:     if S_Y maps lit to 1 then
12:        return maybe
13:     end if
14:  end for
15:  return no
```

---

The mapper 404 includes a first input for receiving an element x to be checked for set membership. The mapper 404 includes a second input in communication with the output of the hash function identifier which receives the set of hash functions $\{h_1, h_2, \ldots h_k\}$. The set of hash functions $\{h_1, h_2, \ldots h_k\}$ identified by the hash function identifier 404 are the same hash functions selected by the hash function selector 304 of the SAT filter builder illustrated in FIG. 3. The mapper 404 maps the element x utilizing the hash functions $\{h_1, h_2, \ldots h_k\}$ to provide set of literals on the output of the mapper 404.

The Boolean operation identifier 408 identifies the Boolean operation selected by the Boolean operation selector 310 of the SAT filter builder 300 and provides this identification at its output.

The equation creator 406 includes a first input in communication with the output of the mapper 404. The first input receives the literals from the mapper 404. The equation creator 406 further includes a second input in communication with the Boolean operation identifier 408 and receives identification of the Boolean operation at the second input. The equation creator 406 further includes an output. The equation creator creates an equation $C_x$ by combining the literals utilizing the identified Boolean operator and provides the equation $C_x$ at its output.

The solution identifier 412 includes an input and an output. The filter identifier 412 receives the filter, $F_Y$ or optionally the transposed filter provided by the SAT filter builder 300 and identifies a solution based upon this filter. The solution identifier provides the identified solution on the output of the solution identifier 412.

The membership checker 410 includes a first input, a second input and an output. The first input is in communication with the output of the equation creator 406 and receives the equation $C_x$. The second input is in communication with the solution identifier 412 to receive the identified solution. The membership checker 410 determines whether the identified solution satisfies the equation $C_x$ and provides this determination at its output.

The indicator 414 includes an input and an output. The input of the indicator 404 is in communication with the output of the membership checker 410. The indicator receives the output of the membership checker 410 and based upon this result provides an indication of set membership as maybe or no at the output of the indicator 414. More specifically, if the membership checker 410 determines that the identified solution satisfies the equation $C_x$, the indicator 414 provides an indication of maybe at its output and if the membership checker 410 determines that the identified solution does not satisfy the equation $C_x$, the indicator 414 provides an indication of no at its output. In sum, the query tool provides that if the clause $C_x$ is falsified by the SAT filter associated with Y, then by construction, x is definitely not in Y. If on the other hand, $C_x$ is satisfied by the SAT filter, then x is potentially in Y.

The query times for filters referenced in Table 4 were measured and provided below in Table 5. Table 5 provides a comparison between the query times of the most efficient SAT filters (i.e. those filters with an efficiency closest to 1) versus optimal Bloom filters built using the same data set and false positive rate. Specifically, $2^{27}$ random elements were provided to each of the filters and the time taken to query the filter and determine whether each element of the set at issue was measured.

Table 5 illustrates that a SAT filter of the present invention where, k=5 can

TABLE 5

Seconds taken to query the Bloom and SAT filters described in Table 4 with $2^{27}$ random elements

| | $m = 2^{14}$ | | $m = 2^{15}$ | | $m = 2^{16}$ | | $m = 2^{17}$ | |
|---|---|---|---|---|---|---|---|---|
| | Bloom | SAT | Bloom | SAT | Bloom | SAT | Bloom | SAT |
| k = 3, s = 11 → p ≈ 23.02% | 30 | 84 | 30 | 84 | 30 | 84 | 30 | 85 |
| k = 4, s = 22 → p ≈ 24.18% | 31 | 186 | 31 | 186 | 31 | 185 | 31 | 185 |
| k = 5, s = 44 → p ≈ 24.74% | 31 | 415 | 31 | 410 | 31 | 401 | 31 | 421 |
| k = 6, s = 89 → p ≈ 24.62% | 31 | 1034 | 31 | 1031 | 31 | 1028 | 31 | 1011 |

The s and k parameters are only applicable to the SAT filters.

perform approximately 300,000 queries per second (i.e., $$\frac{2^{27}}{410} \approx 300,000).$$

Although this is approximately 14 times slower than some Bloom filters, the SAT filter query speed can be increased by either decreasing k (which may increase long term storage, i.e. decrease efficiency) or by storing the solutions transposed and making use of optimization techniques such as bit-packing and word-level instructions. This second option produces SAT filters that can be queried within an order of magnitude of Bloom filters. It is recognized that the use of multiple solutions requires more one-time work in order to find disparate solutions to a single random k-SAT instance.

The results of building and querying a set SAT filters are presented below in Table 6. The desired false positive rate for the filters to be built was ¼. As in the filters of Table 5, each filter was queried with $2^{27}$ random elements.

TABLE 6

Build time, filter size, query time, and achieved false positive rate for single instance SAT filters built with E = 0.75 and $m_* = 2^{14.}$

| | Build Time | Size | Query Time |
|---|---|---|---|
| SAT Filter | | | |
| k = 4, s = 22 → p ≈ 24.18% | 20802 | 44748 | 47 |
| k = 5, s = 44 → p ≈ 24.74% | 610 | 44000 | 51 |
| k = 6, s = 89 → p ≈ 24.62% | 643 | 44144 | 61 |
| Bloom Filter k = 2 | | | |
| p ≈ 24.18% | 1 | 48219 | 31 |
| p ≈ 24.74% | 1 | 47638 | 31 |
| p ≈ 24.62% | 1 | 47797 | 31 |

Table 6 illustrates that SAT filters can be built that use less long term storage than Bloom filters and also have comparable query speed and false positive rates.

Thus the SAT filter of the present invention is a simple filter construction that is efficient with respect to the amount of long-term memory storage required and with respect to query time; i.e. SAT filters achieve the information-theoretic limit and support fast queries. SAT filter can therefore be used effectively for testing set membership in large families of sets, providing significant improvement over current techniques such as the standard Bloom filter and the compressed Bloom filter.

While preferred embodiments of the present invention are shown and described, it is envisioned that those skilled in the art may devise various modifications of the present invention without departing from the spirit and scope of the appended claims.

What is claimed:

1. A satisfiability filter builder implemented by a computer including memory for storing information comprising:
    a domain subset identified for identifying element of a domain subset;
    a hash function selector for selecting a set of hash functions, wherein variables produced by said hash functions range from –n to n;
    a mapper in communication with said domain subset identifier and said hash function selector, wherein said mapper maps each of said identified elements of said domain subset based upon said selected set of hash functions to a set of literals, wherein the size of said set of literal is k;
    an equation creator in communication with sad mapper, said equation creator combines each said set of literals to create a plurality of equations wherein the number of equations created is identified as m and wherein each equation of said plurality of equations relates to an identified element of said domain subset; and
    a conjoiner in communication with said equation creator for conjoining said plurality of equations to provide a satisfiability instance, wherein said satisfiability instance is stored in 32*m*k bits of memory.

2. The satisfiability filter builder of claim 1 further comprising: an array builder in communication with an equation solver, wherein said array builder receives a solution to said satisfiability instance from said equation solver and creates an array based upon said solution and wherein said solution is stored in the array, said array having a length of n bits.

3. The satisfiability filter builder of claim 2, further comprising: a transposer in communication with said array builder for transposing the array provided by said array builder.

4. The satisfiability filter builder of claim 1, further comprising: a Boolean operation selector in communication with said equation creator and for selecting a Boolean operation; and wherein said plurality of equations crated by said equation creator are based upon said selected Boolean operation.

5. A method of building a satisfiability filter comprising the steps of:
    identifying a subset of a domain;
    identifying the elements in the subset;
    selecting a set of hash functions;
    mapping each element of the subset to a set of literals, utilizing the selected set of hash functions;
    combining each set of literals using a Boolean function to create a set of equations;
    conjoining the equations of the set of equations to provide a satisfiability instance;
    creating an array based on a solution to the satisfiability instances;
    identifying an element of a domain to be tested for set membership;
    selecting an element for which set membership is to be tested;
    utilizing the selected set of hash functions to map the selected element to a set of literals;
    combining the literals to create a test equation;
    identifying a solution associated with the satisfiability filter;
    determining whether said test equation is satisfied by the solution associated with the satisfiability filter; and
    providing an indication of set membership based upon the determination of whether the test equation is satisfied.

6. The method of claim 5, wherein said Boolean function is disjunctive OR and said step of conjoining the equations is performed using the conjunctive normal form (CNF).

7. The method of claim 5, wherein said Boolean function is exclusive OR and said step of conjoining the equations is performed using a sparse matrix format.

8. The method of claim 5, wherein said Boolean function is NOT ALL EQUAL and said step of conjoining the equations is performed using the conjunctive normal form (CNF).

9. The method of claim 5, wherein said step of creating an array includes creating an array based on a plurality of solutions to said satisfiability instance.

10. The method of claim 9, wherein said multiple solutions are disparate.

11. The method of claim 10, further including the steps of:
calculating the observed false positive rate associated with each solution; and adjusting the equations if the observed false positive rate does not meet an identified false positive rate threshold.

12. The method of claim 9, further including the step of adjusting the false positive rate provided by the filter by adjusting the number of solutions on which the array is based.

13. The method of claim 9, further including the step of transposing the array.

14. The method of claim 5, further comprising the step of:
selecting an additional set of hash functions;
mapping each element of the subset to an additional set of literals utilizing the additional set of hash functions;
combining each additional set of literals using the Boolean function to create an additional set of equations;
conjoining the equations of the additional set of equations to provide an additional satisfiability instance; and
creating an additional array based on a solution to the additional satisfiability instance.

15. The method of claim 14, further comprising the step of:
adjusting the false positive rate of the satisfiability filter by adjusting the number of set of hash functions utilized to provide satisfiability instances.

16. The method of claim 5, wherein said step of identifying a solution is repeated to identify multiple solutions associated with the satisfiability filter and said step of determining whether said equation is satisfied is performed for each solution identified.

17. The method of claim 16, wherein said step of identifying a set of hash functions is repeated to identify multiple set of hash functions;
said steps of utilizing, combining, identifying a solution and determining are repeated for each set of hash functions; and
wherein said step of providing an indication of set membership is based upon the determination of whether the equation is satisfied for each set of hash functions.

18. A satisfiability filter query tool implemented by a computer for querying a satisfiability filter to determine membership of an element in a set, the computer including memory for storing information and the tool comprising:
a hash function identifier for identifying the hash functions used to build the satisfiability filter wherein variables produced by said hash functions range from −n to n;
a mapper in communication with said hash function identifier for mapping the element to a set of literals utilizing the identified hash functions;
an equation creator in communication with said mapper wherein said equation creator creates an equation based upon said literals;
a solution identifier, for receiving the satisfiability filter and identifying a solution to the satisfiability filter stored in memory as an array, said array having a length of n bits;
a membership checker in communication with said solution identifier and said equation creator;
wherein said membership checker applies said solution to said equation created by said equation creator and determines whether said solution satisfies said equation; and
an indicator for providing an indication to user indicating whether said element is a member of the set based upon said determination of said membership checker.

19. The tool of claim 18, further comprising:
a Boolean operation identifier in communication with said equation creator, wherein said equation creator creates said equations based upon said Boolean operation identified by said Boolean operation identifier.

* * * * *